Sept. 15, 1925.  1,553,814
S. M. HANSEN
CENTERING AND SURFACING TOOL
Filed July 15, 1921
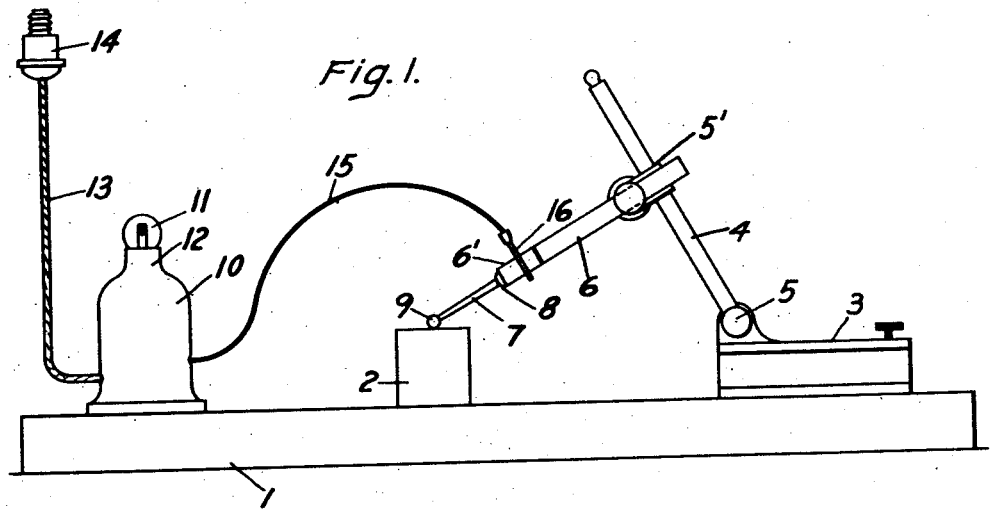
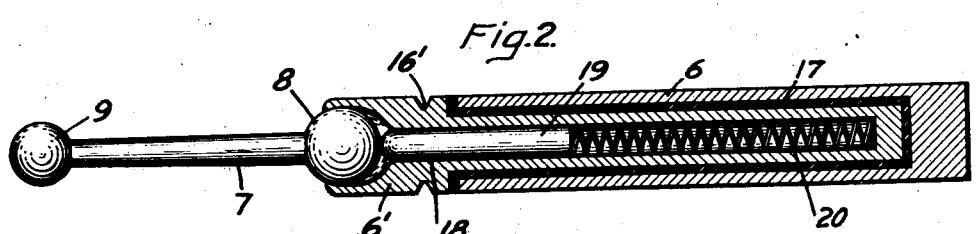
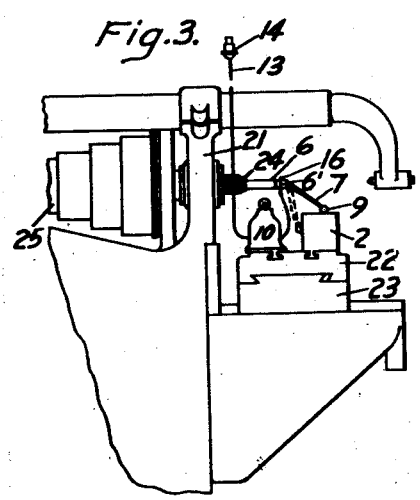
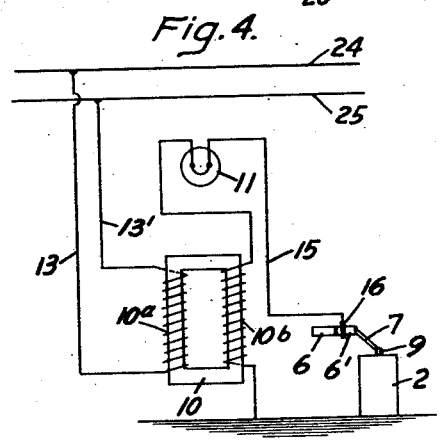
Inventor,
Sinius M. Hansen
By John G. McManus
Att'y.

Patented Sept. 15, 1925.

1,553,814

UNITED STATES PATENT OFFICE.

SINIUS M. HANSEN, OF LYNN, MASSACHUSETTS.

CENTERING AND SURFACING TOOL.

Application filed July 15, 1921. Serial No. 484,869.

*To all whom it may concern:*

Be it known that I, SINIUS M. HANSEN, a citizen of the United States, residing at Lynn, in the county of Essex and State of Massachusetts, have invented certain new and useful Improvements in Centering and Surfacing Tools, of which the following is a specification.

The object of my invention is to provide a unique type of instrument of the character above mentioned, which will not only measure to greater accuracy than similar devices, surface gauges, etc., now in use, but provide the additional feature of indicating by a suitable signal (such as by the lighting or extinguishing of an incandescent lamp) when the surface to be measured is to size or off size respectively.

The manner and means of accomplishing the purpose of my invention will be more clearly understood by referring to the accompanying specification and drawing, in which Fig. 1 represents a side elevation of the measuring devices for carrying out my invention; Fig. 2 represents an enlarged view in partial sectional elevation of the detector; Fig. 3 represents an end elevation of a milling machine, on which is a size block set up for adjustment to locate the true center of the spindle by the improved means of my invention; and Fig. 4 represents in diagram the manner of application of my invention and the electrical connections involved.

Referring more particularly to Fig. 1, 1 represents the usual metal bench block, upon which is mounted a size block or other device 2, the accuracy of dimensions of which is to be tested; 3 represents the usual surface gauge having an arm 4 movable in the joint 5. Carried by a bracket 5' secured to the arm 4 is a detector arm 6 in which is mounted a deflecting finger or gauge finger 7, movable in the arm 6 by means of a ball and socket connection 8, best shown in Fig. 2. For the purposes as illustrated in Fig. 1, the joint 8 may be dispensed with and the finger 7 may be an integral part of the detector 6. On the end of the finger 7 is a ball terminal 9. 10 represents a small low voltage transformer for reducing the voltage to a value sufficient to operatively furnish energy for a small indicating lamp 11, which may be mounted in the transformer head 12. This transformer 10 is placed on the bench block, lathe bed, milling machine bed, or other apparatus or device upon which the work to be tested rests. The primary of the transformer is connected by means of a conductor cord 13 to plug connector 14, and the secondary is connected by means of a conductor cord 15 to the detector arm 6 by means of a conducting brush 16, which embraces the head 6' of the detector arm in a manner to turn in an annular slot or groove 16'. The purpose of this arrangement is to transmit current to the detector ball 9, and from thence through the work to ground and complete the circuit to the primary side or conductor 13 by means of the transformer 10, which is also grounded. Thus, should the detector or gauge be applied to be driven in a milling machine head, lathe, or other similar apparatus, by means of this slip ring or brush 16 the current from the secondary side of the transformer may be fed thereto, notwithstanding the fact that the detector arm 6 is revolving (Fig. 3).

Referring again to Fig. 2, the head 6' of the detector is insulated from the main body thereof 6 by means of any suitable insulating material 17. A space 18 is provided in the detector arm back of the ball joint 8 for the reception of a pin 19 and spring 20. The purpose of this arrangement is to maintain an outward thrust on the ball 8.

Referring now to Fig. 3 which illustrates my invention as applied to a milling machine, 21 represents the usual milling machine head and 22 the slide on the bed 23. The gauge block or other work 2 is here shown set on the slide 22. The detector arm 6 is mounted in a chuck 24. The pulley shaft 25 is driven in the usual manner by a suitable source of power (not shown). When the milling machine is in driving operation, the plug 14 is screwed into any available lamp socket or wall receptacle, and even though the detector arm or spindle 6 is revolving, current is delivered thereto by means of the slip ring 16, thence through the finger 7, work 2, slide 22, transformer 10, and back through the conductor 13 to plug 14 and into the supply circuit.

The diagram of connections, Fig. 4, will now be described; 24 and 25 represent suitable supply mains connected with which are the conductors 13 and 13', and which wind around one leg of the transformer core to constitute the primary $10^a$, and the other leg of the core is provided with a suitable winding to constitute the secondary winding 10$^b$. The lamp 11 is in this secondary circuit and may be of any suitable low voltage as say 2 to 6 volts, the voltage of the primary side of the circuit being say 110 volts. The conductor 15 conveys the current from the low voltage or secondary side of the transformer to the detector 6 by means of the slip ring 16.

The operation of my invention is as follows:

Assuming that the block or work 2 to be measured as in Fig. 1 is on the stationary bench block 1, the surface gauge 3 is so adjusted that the ball terminal 9 of the finger 7 will engage the top surface of the work or block 2. When the finger 7 and arm 6 are set to this adjusted position, contact is made by the ball terminal 9, which completes the circuit, the work 2, bench block 1, secondary 10$^b$ of the transformer, light 11. The primary connection, of course, is from the supply mains 24 and 25, through the plug connector 14 and conductor 13, 13′ to and through the primary leg 10$^a$ of the transformer 10.

The method of testing the accuracy of the gauge block 2 or other work on the bench block as in Fig. 1, for example, is as follows: The ball terminal 9 is so adjusted by means of the position of the detector arm 6 to make contact at the required height with a point on the surface of the gauge block. After this adjustment has been made, the gauge block or work is moved around under the terminal end or ball 9 until the whole surface has been inspected. Wherever the gauge block or work is to the predetermined size, the electrical circuit will be completed through the gauge block or work 2 and remaining parts of the circuit as heretofore described and the lamp 11 lighted. The moment the gauge block or work 2 falls short of the predetermined dimensions, contact at the ball terminal fails and the light goes out. In this manner, accuracy of dimensions can be determined within .0002 inch. In testing size block 2, of Fig. 1, if the light flickers or goes out when the gauge is moved to shift the ball 9 across the size block, the surface or surfaces of the latter are planed until a constant light follows transit of the ball across the surface. The other surfaces can be similarly explored, and the final result will be a surface true to an extraordinary degree of accuracy.

When it is desired to locate a true center or properly adjust a given piece of work in a milling machine, for example, (as in Fig. 3) with reference to the rotating spindle 24 of the machine, a gauge block 2 is set on the slide 22 beneath the ball terminal 9 of the detector 6, and the bed of the machine 23 raised until the top surface of the gauge block is substantially in line with the spindle. The final accurate adjustment or line-up for centering is secured by putting on the power and rotating the spindle and detector. This causes contact of the ball terminal 9 and gauge block 2 to light the lamp 11 in the manner heretofore described. While the gauge block is slightly out of line with the spindle, the light will flicker, but the true adjustment can easily and finally be made by raising and lowering the bed slightly until the light is steady. When it is steady, the true center has been found and a vernier is set to the distance called for in the specifications for a given hole to be drilled—minus the radius of the ball contact, which is .125 inch, and the required hole drilled or other required mechanical operation performed. If the work is oversize, the ball 9 will be thrown off center by the force of the frictional engagement of the finger 7 with the work. We, therefore, have two convenient limits for getting down to accuracy of measurement, one the condition where the work leaves the ball terminal and opens the contact, the other, the condition where the work being oversized, throws the rotating ball off center. The dotted line position of the detector, Fig. 3, also illustrates how the device may be employed in another manner to assist in setting up or lining up the work. In this case, the finger 7 and ball 9 are set in a predetermined relation to the work while the power is not on, and simply used as a liner or gauge to line up the work on the side. If the bed 23 of the milling machine be shifted to the right the correctness of alignment of the axis of the chuck with the horizontal feed along the bed may be demonstrated. The vernier indications of the ball distance from the bed when rotated in full line and dotted line positions, respectively in different longitudinal positions along the machine will indicate the slightest error of alignment, and necessary compensation may be made or corrected before the holes are drilled. The block 2 may now be raised as previously described by raising the table to locate the center.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. A gauging tool for determining true superficial alignment, comprising an insulated contact, a holder for the same, said contact being delicately socketed in frictional engagement with the holder, a support for the holder relatively movable to the contact, and an electric indicator in a circuit including a source of current, the socketed contact, the work and the frame of the machine.

2. The combination in a gauging tool for finding centers, true alignment and true surface comprising a spindle, and a yielding arm mounted out of alignment with the work and socketed in an insulated ball joint in frictional engagement just sufficient to counterbalance the weight of the arm, said arm carrying a ball contact at the outer end, and an electric indicating lamp in a local circuit including a source of current, the yielding arm, the work and the frame of the machine on which the tool is rotatively mounted, whereby eccentricity of the ball contact under occasional adjustment may be corrected to an extreme degree of precision, whereby when the predetermined height of gauge block center or surface falls slightly short of the required relation with the contact ball the light will flicker, when too high the ball will run free of the work or gauge block, and when the true surface or height relation or center is established the light will burn steadily.

SINIUS M. HANSEN.